United States Patent Office 3,100,771
Patented Aug. 13, 1963

3,100,771
ANDROSTANO[3,2-c]-5'-HYDROXY-Δ²'-ISOXAZO-LINES AND THE PREPARATION THEREOF
Andrew John Manson, North Greenbush, N.Y., assignor to Sterling Drug Inc., New York, N.Y., a corporation of Delaware
No Drawing. Filed Aug. 10, 1962, Ser. No. 216,076
6 Claims. (Cl. 260—239.55)

This invention relates to new heterocyclic steroids and in particular is concerned with androstano[3,2-c]-5'-hydroxy-Δ²'-isoxazolines and the preparation thereof.

The compounds of the invention have the structural formula

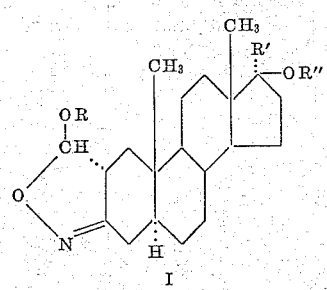

wherein R and R'' are selected from the group consisting of hydrogen and carboxylic acyl radicals having from one to ten carbon atoms and a molecular weight less than 200; and R' is selected from the group consisting of hydrogen, lower-alkyl and lower-alkynyl.

It has been found that the reaction of a steroid having the formula

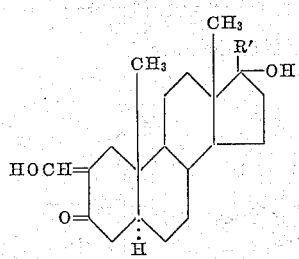

with hydroxylamine in lower-alkanol solution at approximately neutral pH produces three products, a steroido-[2,3-d]isoxazole, a steroido[3,2-c]isoxazole, and a steroido[3,2-c]-5'-hydroxy-Δ²'-isoxazoline of Formula I (R and R'' are H). The last named compound can be separated from the mixture of products as the least soluble component in a non-polar organic solvent. The approximately neutral pH is obtained by using hydroxylamine in the form of its hydrochloride salt and buffering the latter with approximately one equivalent of an alkali metal salt of a weak acid such as sodium or potassium acetate. The non-polar organic solvent can be any such solvent in which the product mixture is at least slightly soluble. Ethyl acetate has been found to be a particularly satisfactory solvent for fractional crystallization of the product mixture.

When R' in the above Formula I is lower-alkyl it stands for a lower-alkyl group having from one to four carbon atoms, thus including methyl, ethyl, propyl, isopropyl, butyl and the like. When R' in the above Formula I is lower-alkynyl it stands for a lower-alkynyl group having from two to four carbon atoms, thus including ethynyl, 1-propynyl, 2-propynyl (propargyl), 1-butynyl and the like.

In compounds of the above Formula I where R and/or R'' are carboxylic acyl radicals said acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. The acylated compounds are prepared by conventional esterification procedures, as by reaction of the corresponding carbinols with the appropriate acid anhydride or acid halide in the presence of pyridine. The 5'-hydroxy group and 17-hydroxy group (R' is hydrogen) esterify readily upon heating at a temperature of 100° C. or lower for a brief period (about one hour). In order to prepare esters of the 17-hydroxy group (R' is lower-alkyl) more stringent conditions are needed (reflux temperature). In the latter case some dehydration to the isoxazole may occur but the desired bis-ester may be separated by physical methods. The resulting bis-ester (I; R and R'' are acyl, R' is lower-alkyl) can be selectively saponified to prepare a 17-mono ester (I; R is H, R'' is acyl, R' is lower-alkyl).

The structures of the compounds of Formula I were assigned on the basis of elementary analysis and infrared and nuclear magnetic resonance (NMR) spectra, as well as from the fact that upon dehydration they are converted to isoxazoles. For example, 17β-hydroxy-17α-methylandrostano[3,2-c]-5'-hydroxy-Δ²'-isoxazoline (I; R is H, R' is methyl, R'' is H) upon treatment with a catalytic amount of concentrated hydrochloric acid in boiling acetic acid solution, loses two molecules of water and is converted quantitatively to 17,17-dimethyl-18-nor-13-androsteno[3,2-c]isoxazole. The structure of the latter was firmly established by ultraviolet, infrared and NMR spectra. The stereochemical assignments are based on conformational analysis and relative difficulty of dehydration of the 5'-hydroxy group.

Endocrinological studies of the compounds of the invention have shown that they possess useful metabolic and hormonal properties. In particular they have been found to have pituitary inhibiting, anabolic and myotropic activity. The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The compounds of the invention are also useful as intermediates for preparing steroido[3,2-c]isoxazoles by dehydration.

The following examples will further illustrate the invention without the latter being limited thereby.

EXAMPLE 1

*17β-Hydroxy-17α-Methylandrostano[3,2-c]-5'-Hydroxy-Δ²'-Isoxazoline*

[I; R is H, R' is CH₃, R'' is H]

To a solution of 10.0 g. of 2-hydroxymethylene-17α-methylandrostan-17β-ol-3-one, M.P. 162–177° C., in 300 ml. of ethanol was added a solution of 2.09 g. of hydroxylamine hydrochloride and 3.88 g. of sodium acetate trihydrate in 10 ml. of water. The resultant solution was boiled under reflux for four hours and then concentrated under reduced pressure to a volume of 50 ml. Water and ethyl acetate were added to the residue, the layers separated, and the aqueous layer was extracted with ethyl acetate. The combined organic extracts were dried over anhydrous sodium sulfate, filtered, and concentrated to a volume of 100 ml. Upon cooling, there crystallized from the solution 2.58 g. of product which was separated and recrystallized several times from ethyl acetate to give 1.52 g. of 17β-hydroxy-17α-methylandrostano-[3,2-c]-5'-hydroxy-Δ²'-isoxazoline in the form of colorless needles, M.P. 235.2–240.2° C. (corr.), $[\alpha]_D = -138.5°$ (1% in chloroform); infrared absorption at 3.10, 3.44, 6.14 and 6.19μ.

EXAMPLE 2

*17β-Hydroxy-17α-Methylandrostano[3,2-c]-5'-Acetoxy-Δ²'-Isoxazoline*

[I; R is COCH₃, R' is CH₃, R'' is H]

A solution of 10.0 g. of 17β-hydroxy-17α-methylandrostano[3,2-c]-5'-hydroxy-Δ²'-isoxazoline (Example 1) and 7.5 ml. of acetic anhydride in 100 ml. of pyridine was heated on a steam bath for 75 minutes. The reaction mixture was diluted with 1 liter of water and extracted with ether. The ethereal extract was dried over anhydrous sodium sulfate and concentrated to dryness in vacuo. The residual oil was crystallized from 30 ml. of ether to give 2.21 g. of colorless needles, M.P. 166–172° C. The residual material from the mother liquor was subjected to chromatography on 360 g. of Florisil (activated magnesium silicate). Elution with 7:3 pentane-ether gave several crystalline fractions. The center fractions (3.12 g.) were combined and recrystallized from ether. There was obtained 2.66 g. of colorless needles, M.P. 170–173° C., undepressed on admixture with the above crop of 2.21 g. Recrystallization from ether gave pure 17β-hydroxy-17α-methylandrostano[3,2-c]-5'-acetoxy-Δ²'-isoxazoline, M.P. 167.2–169.2° C. (corr.), $[\alpha]_D = -269.2°$ (1% in chloroform), infrared absorption at 2.81, 3.45, 5.69, 6.90 and 8.24μ; NMR spectrum: signals at 6.88 (doublet), 2.62, 1.75, 1.53 and 1.40 p.p.m.

Similarly 17β-hydroxy-17α-methylandrostano[3,2-c]-5'-hydroxy-Δ²'-isoxazoline can be caused to react with propionic anhydride, caproyl chloride, β-cyclopentylpropionyl chloride, benzoyl chloride, p-nitrobenzoyl chloride, 3,4,5-trimethoxybenzoyl chloride, phenylacetyl chloride, cinnamoyl chloride, or p-chlorophenoxyacetyl chloride, to give, respectively, 17β-hydroxy-17α-methylandrostano-[3,2-c]-5'-propionoxy-Δ²'-isoxazoline (I; R is COCH₂CH₃, R' is CH₃, R'' is H], 17β-hydroxy-17α-methylandrostano-[3,2-c]-5'-caproyloxy-Δ²'-isoxazoline [I; R is $$CO(CH_2)_4CH_3$$

R' is CH₃, R'' is H], 17β-hydroxy-17α-methylandrostano-[3,2-c]-5'-(β-cyclopentylpropionoxy)-Δ²'-isoxazoline [I; R is COCH₂CH₂C₅H₉, R' is CH₃, R'' is H], 17β-hydroxy-17α-methylandrostano[3,2-c]-5'-benzoyloxy-Δ²'-isoxazoline [I; R is COC₆H₅, R' is CH₃, R'' is H], 17β-hydroxy-17α-methylandrostano[3,2-c]-5'-(p-nitrobenzoyloxy)-Δ²'-isoxazoline [I; R is COC₆H₄NO₂-p, R' is CH₃, R'' is H], 17β-hydroxy-17α-methylandrostano-[3,2-c]-5'-(3,4,5-trimethoxybenzoyloxy)-Δ²'-isoxazoline [I; R is COC₆H₂(OCH₃)₃-3,4,5, R' is CH₃, R'' is H], 17β-hydroxy-17α-methylandrostano[3,2-c]-5'-phenylacetoxy-Δ²-isoxazoline [I; R is COCH₂C₆H₅, R' is CH₃, R'' is H], 17β-hydroxy-17α-methylandrostano[3,2-c]-5'-cinnamoyloxy-Δ²'-isoxazoline [I; R is COCH-CHC₆H₅, R' is CH₃, R'' is H], or 17β-hydroxy-17α-methylandrostano[3,2-c]-5'-(4-chlorophenoxyacetoxy)-Δ²'-isoxazoline [I; R is COCH₂OC₆H₄Cl-4, R' is CH₃, R'' is H].

When 17β-hydroxy-17α-methylandrostano[3,2-c]-5'-hydroxy-Δ²'-isoxazoline was heated to reflux temperature in acetic anhydride solution there was produced a product mixture containing 17β-acetoxy-17α-methylandrostano[3,2-c]-5'-acetoxy-Δ²'-isoxazoline [I; R is COCH₃, R'' is COCH₃] and 17β-acetoxy-17α-methylandrostano-[3,2-c]isoxazole.

EXAMPLE 3

17β-hydroxyandrostano[3,2-c]-5'-hydroxy-Δ²'-isoxazoline [I; R is H, R' is H, R'' is H] was prepared from 3.78 g. of 2-hydroxymethyleneandrostan-17β-ol-3-one and 0.825 g. of hydroxylamine hydrochloride. There was obtained 1.31 g. of 17β-hydroxyandrostano[3,2-c]-5'-hydroxy-Δ²'-isoxazoline, prisms, M.P. 245–253° C. (uncorr., dec.) when recrystallized from methanol and from acetone; infrared absorption at 2.95, 3.05, 3.44, 6.01, 6.81 and 6.90μ.

17β-hydroxyandrostano[3,2-c]-5'-hydroxy-Δ²'-isoxazoline when caused to react with acetic anhydride in pyridine according to the procedure described above in Example 2 yields 17β-acetoxy-androstano[3,2-c]-5'-acetoxy-Δ²'-isoxazoline [I; R is COCH₃, R' is H, R'' is COCH₃].

By replacement of the 2-hydroxymethylene-17α-methylandrostan-17β-ol-3-one in Example 1 by a molar equivalent amount of 2-hydroxymethylene-17α-ethylandrostan-17β-ol-3-one, 2-hydroxymethylene-17α-propylandrostan-17β-ol-3-one, 2-hydroxymethylene-17α-isopropylandrostan-17β-ol-3-one, 2-hydroxymethylene-17α-butylandrostan-17β-ol-3-one, 2-hydroxymethylene-17α-ethynylandrostan-17β-ol-3-one, or 2-hydroxymethylene-17α-propargylandrostan-17β-ol-3-one, there can be obtained, respectively, 17β-hydroxy-17α-ethylandrostano[3,2-c]-5'-hydroxy-Δ²'-isoxazoline [R is H, R' is C₂H₅, R'' is H], 17β-hydroxy-17α-propylandrostano[3,2-c]-5'-hydroxy-Δ²'-isoxazoline [R is H, R' is (CH₂)₂CH₃, R'' is H], 17β-hydroxy-17α-isopropylandrostano[3,2-c]-5'-hydroxy-Δ²'-isoxazoline [R is H, R' is CH(CH₃)₂, R'' is H], 17β-hydroxy-17α-butylandrostano[3,2-c]-5'-hydroxy-Δ²'-isoxazoline [R is H, R' is (CH₂)₃CH₃, R'' is H], 17β-hydroxy-17α-ethynylandrostano[3,2-c]-5'-hydroxy-Δ²'-isoxazoline [R is H, R' is C≡CH, R'' is H], or 17β-hydroxy-17α-propargylandrostano[3,2-c]-5'-hydroxy-Δ²'-isoxazoline [R is H, R' is CH₂C≡CH, R'' is H].

I claim:

1. A compound of the formula

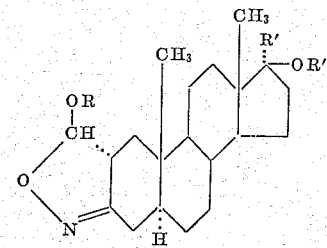

wherein R and R'' are selected from the group consisting of hydrogen and carboxylic acyl radicals having from one to ten carbon atoms and a molecular weight less than 200; and R' is selected from the group consisting of hydrogen, lower-alkyl and lower-alkynyl.

2. 17β-hydroxy-17α-methylandrostano[3,2-c]-5'-hydroxy-Δ²'-isoxazoline.

3. 17β-hydroxy-17α-methylandrostano[3,2-c]-5'-acetoxy-Δ²'-isoxazoline.

4. 17β-hydroxyandrostano[3,2-c]-5'-hydroxy-Δ²'-isoxazoline.

5. The process for preparing a compound of the formula

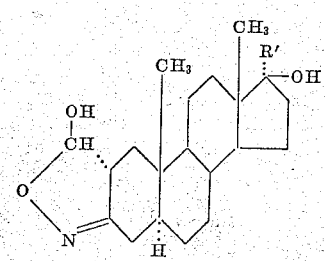

wherein R' is selected from the group consisting of hydrogen, lower-alkyl and lower-alkynyl, which comprises reacting a compound of the formula

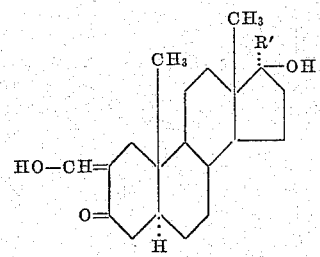

with hydroxylamine in lower-alkanol solution at approximately neutral pH, and separating the component of the product mixture least soluble in a non-polar organic solvent.

6. The process for preparing 17β-hydroxy-17α-methyl-androstano[3,2-c]-5′-hydroxy-$\Delta^{2'}$-isoxazoline which comprises reacting 2-hydroxymethylene-17α-methylandrostan-17β-ol-3-one with hydroxylamine in lower-alkanol solution at approximately neutral pH, and separating the component of the product mixture least soluble in a non-polar organic solvent.

No references cited.